UNITED STATES PATENT OFFICE.

HERMAN DECKER, OF HANOVER, GERMANY, ASSIGNOR TO FARBENFABRIKEN VORM. FRIEDR. BAYER & CO., OF ELBERFELD, GERMANY, A CORPORATION OF GERMANY.

6.7-METHYLENEDIOXY-3.4-DIHYDROISOQUINOLIN.

1,010,598.     Specification of Letters Patent.     Patented Dec. 5, 1911.

No Drawing.     Application filed April 11, 1911. Serial No. 620,429.

*To all whom it may concern:*

Be it known that I, HERMAN DECKER, doctor of philosophy, chemist, citizen of the German Empire, residing at Hanover, Germany, have invented new and useful Improvements in 6.7-Methylenedioxy-3.4-dihydroisoquinolin, of which the following is a specification.

I have found that the hitherto unknown 6.7-methylenedioxy - 3.4 - dihydroisoquinolin can be obtained by treating the formyl compound of homopiperonylamin with phosphorous pentoxid. The reaction probably proceeds in accordance with the following equation:

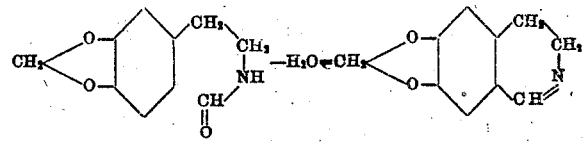

It is a white powder melting at 90–91° C. soluble in alcohol and ether, insoluble in ligroin. Its solutions show a blue fluorescence. By heating it with $ICH_3$ (1 molecule) it is converted into the iodohydrate of hydrastinin melting at 234° C.

In order to illustrate the new process more fully the following example is given, the parts being by weight:—10 parts of the formyl compound of homopiperonylamin (needles M. P. 61–62° C.) are dissolved in 75 parts of toluene and heated with 40 parts of $P_2O_5$ to 100° C. The toluene is distilled off, the residue is poured into water and the new product is precipitated with NaOH.

The formyl compound of homopiperonylamin is obtained by treating 3.4-dioxy-ω-phenylethylamin with formic acid.

I claim:—

The herein described 6.7-methylenedioxy-3.4-dihydroisoquinolin which is a white powder melting at 90–91° C., soluble in alcohol and ether, being insoluble in ligroin; and being converted by treatment with $ICH_3$ into the iodohydrate of hydrastinin melting at 234° C., substantially as described.

In testimony whereof I have hereunto set my hand in the presence of two subscribing witnesses.

HERMAN DECKER. [L. S.]

Witnesses:
ERNEST C. OBERHOLTZER,
M. BEHNE.